Sept. 29, 1970     M. SERRANO ET AL     3,531,562
INCREASING THE DENSITY OF THERMOPLASTIC FOAM SCRAP
Filed March 12, 1969     2 Sheets-Sheet 1
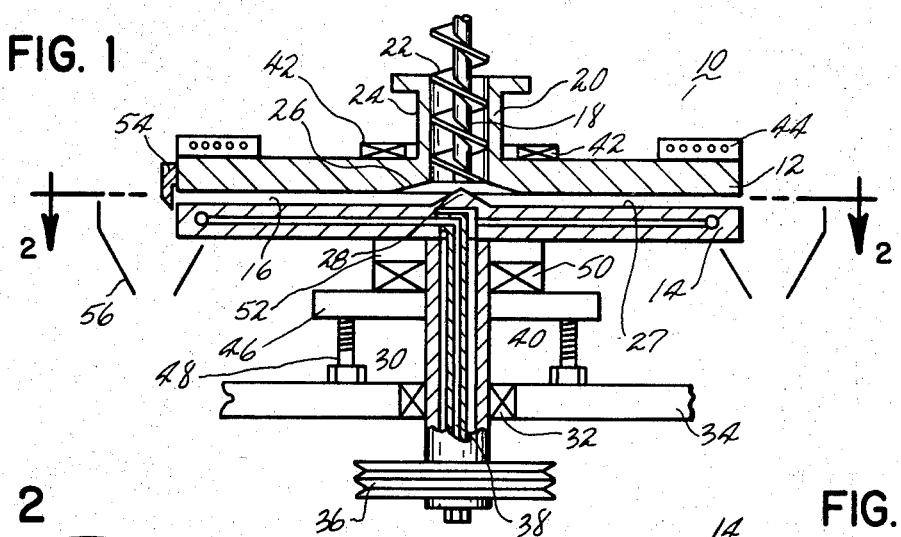
FIG. 1
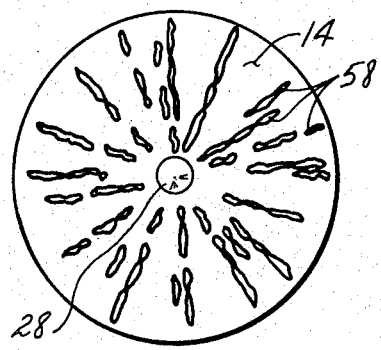
FIG. 2
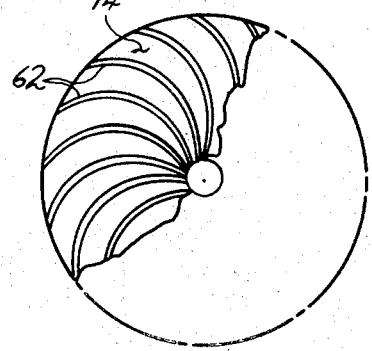
FIG. 3
FIG. 4
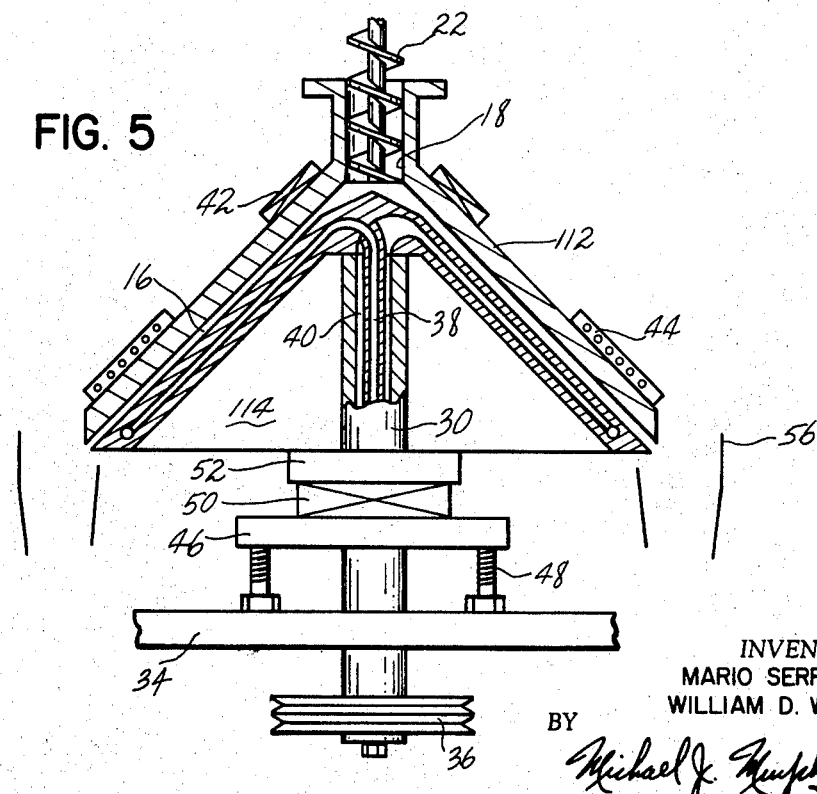
FIG. 5
INVENTOR.
MARIO SERRANO
WILLIAM D. WOLF
BY
ATTORNEY Sept. 29, 1970   M. SERRANO ET AL   3,531,562
INCREASING THE DENSITY OF THERMOPLASTIC FOAM SCRAP
Filed March 12, 1969   2 Sheets-Sheet 2
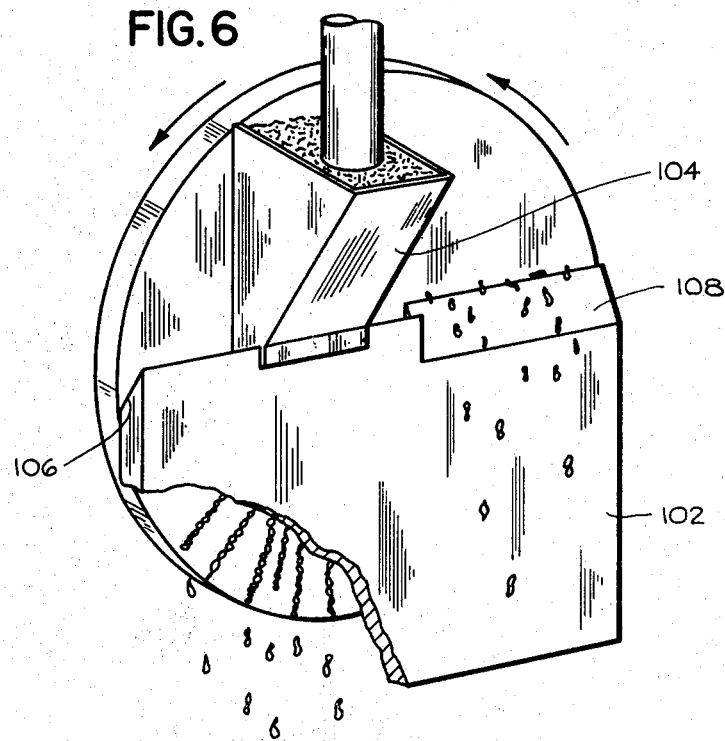
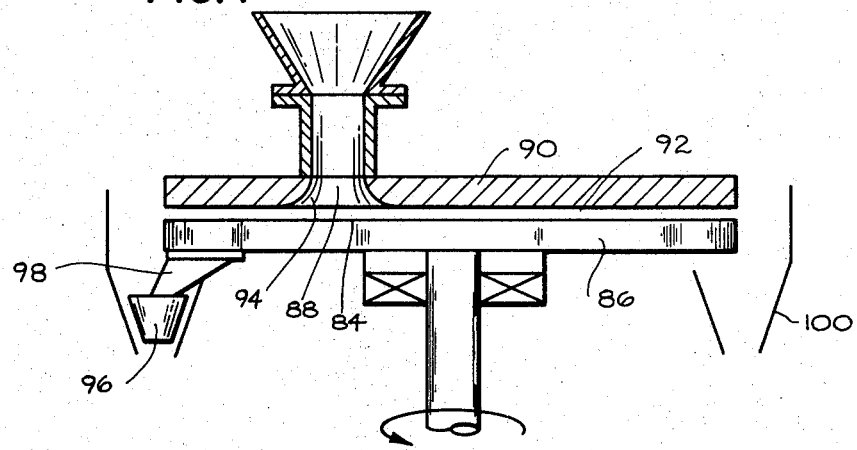
INVENTOR.
MARIO SERRANO
WILLIAM D. WOLF
BY
ATTORNEY:

United States Patent Office 3,531,562
Patented Sept. 29, 1970

3,531,562
INCREASING THE DENSITY OF THERMOPLASTIC FOAM SCRAP
Mario Serrano and William D. Wolf, Simsbury, Conn., assignors to Monsanto Company, St. Louis, Mo., a corporation of Delaware
Continuation-in-part of application Ser. No. 705,443, Feb. 14, 1968. This application Mar. 12, 1969, Ser. No. 806,587
Int. Cl. B29c 29/00
U.S. Cl. 264—310                     3 Claims

ABSTRACT OF THE DISCLOSURE

A method for densifying thermoplastic foam wherein the foam cells are crushed by mulling within a narrow chamber formed by members mounted for relative rotation with respect to each other. The densified foam emerges as a high density curd-like material at the periphery of the members.

BACKGROUND

This application is a continuation-in-part of copending application Ser. No. 705,443 filed Feb. 14, 1968, now abandoned.

This invention relates to a novel method for densifying thermoplastic foam scrap.

Thermoplastic resins having a foaming agent incorporated therein, may be extruded into a foamed sheet, and then formed into useful shapes by known thermoforming techniques such as vacuum, pressure, or drape forming or combinations thereof. As a by-product of such forming processes, there is a great amount of scrap generated which cannot be recycled to form additional foam sheet until it has been further processed to increase its density to a level approximating that of the original resin in the non-foamed state. This is necessary because the high bulk of the low density foam material significantly decreases the output of a downstream foam extruder, wherein capacity is based on its volumetric throughput rate. If the rotational speed of the extruder screw is increased to compensate for the lower density material, the frictional work heat added to the material is increased and an extruder cooling problem arises.

Scrap of a similar nature is also generated by other foam forming processes such as in molding foamable beads by the well-known steam chamber technique or by equivalent methods. Scrap of the type to which the present invention applies may also be generated in processes where the finished foamed product is directly formed, e.g. by extrusion of foam into a useful article such as a log or block-like product. Similarly the present invention is applicable to the reprocessing of off grade or damaged finished foam products. The invention may likewise be used to densify used foamed articles such as vending cups and the like, which presents a waste disposal problem in their high bulk state.

"Scrap" as herein used is meant to include thermoplastic foam materials having a density substantially less than that of the non-foamed resin, which it is desired to increase by reprocessing.

One method presently in use for conditioning foam scrap involves chopping the scrap into a relatively finely divided flake form and then stuffing the high bulk, low density flakes into a standard vented extruder, whereupon through heat and substantial pressure generated within the extruder the scrap is melted and extruded in the form of a plurality of rods, which are then pelletized and later fed to foam forming equipment as a raw material resin. In so doing, however, the time during which the resin is exposed to elevated temperatures is increased, this time commonly being referred to as its heat history. For most resins and in some cases additives including foaming agents, it is desirable to keep the heat history as low as possible, since if it exceeds a certain level substantial decomposition may occur and the quality of the finished product may be affected. Furthermore, this method is obviously expensive, and affects the economics of the overall foaming process due to the high cost of manpower and of the scrap processing equipment (i.e. an extruder built to withstand substantial pressure, cutter and auxiliary handling equipment). The extensive use of valuable processing floor space which is not involved in the actual production of the finished product is also disadvantageous.

SUMMARY OF THE INVENTION

It is therefore an object of the present invention to overcome the above elicited shortcomings of the various prior art methods of reprocessing foam scrap.

It is another object of the present invention to provide a method for recovering foam scrap wherein the processing time is minimized so that the recovered material is provided with virtually no additional heat history, thus minimizing the heat degradation caused by more severe high heat, high shear, high pressure recovery methods of the prior art.

It is a further object of the present invention to provide a novel method whereby the density of thermoplastic foam scrap may be increased to a reprocessable level in a reduced time and at a minimum cost.

A still further object of the present invention is to provide novel densified curds formed by the novel process of the present invention, and which are in a highly useful and convenient form for reprocessing as a feed material for foam resin extrusion.

A further object of this invention is to provide a novel method of blending ingredients used in a foam forming process.

These and other objects and advantages of the present invention are accomplished in a process for conditioning cellular thermoplastic foam scrap by mechanically working the scrap to crush the cells and increase the density thereof, by providing the improvement which comprises establishing a substantially open, planar oriented processing zone limited by a pair of closely spaced opposing surfaces, rotating one of the surfaces at between about 10 to 400 r.p.m. with respect to the other surface, feeding cellular foam scrap having residual foaming agent entrapped within the cells into the processing zone between the closely spaced relatively rotating surfaces, rolling the scrap outwardly against the surfaces toward the periphery thereof for no more than two minutes without changing the spacing of the surfaces from each other to collapse the walls of the foam cells and substantially completely release entrapped residual foaming agent, and regulating the scrap temperature within the processing zone to maintain said temperature within about 25° F. of the glass transition temperature range of the thermoplastic, whereby the density of the scrap is gradually increased as the scrap moves toward the periphery of the surfaces without substantially increasing its heat history.

The product emerges from the periphery in densified curd-like form after an unusually short residence time within the processing chamber. Other ingredients, such as solid foaming agents etc. may be blended into the product by addition to the processing zone along with the scrap feed.

Various other objects and features or advantages of the invention over those of the prior art will appear from a consideration of the following drawings and written description.

DESCRIPTION OF THE DRAWINGS

FIG. 1 is a partially stylized, sectional view showing the apparatus of the present invention;

FIG. 2 is a section taken along the line 2—2 of FIG. 1;

FIG. 3 is a perspective view of some of the densified curds produced by the apparatus shown in FIG. 1;

FIG. 4 is a partial plan view of the rotating member shown in FIG. 2 wherein product guiding grooves have been formed therein;

FIG. 5 is a partially stylized, sectional view, similar to FIG. 1 of the drawings, but showing a modification to the apparatus, wherein the members have a generally conical shape;

FIG. 6 is a schematic, elevational view of another embodiment of the invention depicting a vertically oriented processing chamber; and FIG. 7 is a further schematic, elevational view illustrating an off center feed embodiment of the invention.

DESCRIPTION OF THE PREFERRED EMBODIMENTS

Referring to the drawings, wherein identical numerals refer to identical parts, and more particularly to FIG. 1, there is shown a foam densifier 10 comprising an upper plate member 12 and a lower plate member 14. The upper plate member 12 is supported in a static condition by means not shown, while the lower member 14 is mounted for relative rotation with plate 12. The two plates 12 and 14 are mounted in substantially superposed spaced relation to each other, and accordingly form a narrow, planar oriented, substantially open processing zone 16 therebetween. This chamber 16 is adapted to receive thermoplastic resin foam scrap to be processed by the apparatus. The distance between the two members may be equal along their radial extents, or may vary somewhat dependent on the materials being processed and the desired shape of the densified product. Also, as shown, the distance between the members may be increased in central entry port area 24, so as to accommodate a greater amount of material at the feed section because of the high bulk, low density nature of the feed. Alternatively, this increased area may be provided in the rotary member of the apparatus. Radially extending vanes may be provided in the cutaway portion when in the rotary member to aid in obtaining a bite on the low density material so as to more readily permit its passage into the processing zone. Such vanes on the rotary member could create a slight vacuum depending on the rotary speed so as to pull the feed inwardly, and then expel it radially outwardly into the processing zone or chamber by means of centrifugal force. A cutaway portion may also be provided in the stationary member opposite that in the rotary member to further increase the size of the entry port area at this more or less stagnant center of the processing chamber.

Upper plate 12 is provided generally centrally thereof with an opening 18, which in turn is surrounded by a vertically oriented collar or flange member 20 which may support a feed supply system. Collar 20 is further provided with means for forcing the low density foam feed scrap into chamber 16, such as auger screw 22 which may extend into the throat of a feed hopper or into a supply conduit, not shown, and which is rotated by conventional exterior drive means not shown. The screw, in the alternative, may be attached to the rotary plate 14 and therefore rotated by its drive means to draw material into the processing zone, thus eliminating the need for a separate drive system. A reciprocating ram or pressure foot or gravity also represent acceptable feeding techniques.

As mentioned, entrance portion 24 of chamber 16 in FIG. 1 is larger than the remaining portions of the chamber, with this achieved by means of tapered wall portion 26 of upper member 12. Furthermore, the inner surface 27 of the lower member 14 which is the surface most proximate to upper member 12, may be provided with a domed boss 28 at its center, so as to radially outwardly direct the foam scrap as it is force fed into chamber 16.

Lower member 14 is mounted on shaft 30, which in turn is journaled by means of bearing 32 within a supporting frame 34. The lower end of shaft 30 may be provided with a sheave 36 attached thereto, which is in turn connected to a conventional drive means not shown.

The drive shaft 30 of member 14 may be cored by means of channels 38 and 40, which respectively allow for the entrance and exit of a coolant. Channels 38 and 40 extend radially within the rotating member 14 either partially or entirely throughout its extent, so as to provide for control of its surface temperature. Generally the frictional heat generated by the relative rotation of members 12 and 14 working upon the feed material generates temperatures sufficiently high enough to elevate the temperature of the material to a level adequate to successfully operate the device. However, occasionally it is desirable to provide for additional heating. Such heaters 42 are shown mounted on the outer surface of upper plate 12, though it should be recognized that such heaters may be located elsewhere. Further cooling means may be provided on the upper plate 12 as well, by means, for example, of the channeled collar 44 shown at the peripheral portions thereof.

Shaft 30 may further be provided with adjusting means comprising an adjustable thrust plate 46 connected thereto, which in turn is provided with thrust bearing 50 and wear collar 52. Thus by vertical movement of adjusting screws 48 in either direction, the distance between plates 12 and 14 can be varied to increase or decrease the volume of chamber 16.

Cutting means 54, typically comprising a plurality of spaced cutting elements positioned proximate to the periphery of the plates, may be provided for cutting or breaking off the densified foam scrap as it emerges from chamber 16. Cutting means 54 is preferably mounted at the periphery of the stationary plate. Beneath cutting means 54 is provided a generally circular collection hopper 56 for collecting the densified curds of material. Because of the relatively low temperature at which the process operates (to be described hereafter), the densified curds may be readily collected without sticking together.

Turning now to FIG. 2 of the drawings, plate 14 is therein shown as it would appear in operation, and particularly depicts formation of rolled strands 58 of partially densified foam scrap radially extending outwardly from central boss 28. Strands 58 are rolls of material being processed and are formed by the mulling or rolling action provided by the two plates 12 and 14. Strands 58 progress or move radially outwardly to the periphery of plate 14, whereupon they are dislodged or cut into curds 60 which are typically shown in FIG. 3 of the drawings. The rolling type of movement of the foam as it progresses toward the peripheries of the plates results in continuously exposing new cells to the gentle shearing action of the surfaces of the plate members. As the cells are ruptured, the residual foaming agent is substantially completely released from the open, low pressure processing zone. A negative pressure can be imposed on the processing zone to enhance volatiles removal.

The degree of melting or fusion in the present invention is a function of (a) the temperature of the surfaces of the plates, (b) the rotational speed of the rotating member(s), (c) the surface area of the plates, (d) the spacing of the plates from each other, (e) the surface finish of the plates, and (f) the feed rate of the material to the processing chamber. The energy imparted to the scrap being processed should not be so great as to raise the temperature to a point which results in melting the resin into a completely fused or molten liquid mass but rather should be maintained at a level short of complete fusion such that the resin is in a highly viscous state, capable of being worked and mulled by the plates so as to crush and substantially eliminate the voids and therefore its foam cell characteristics. This highly viscous operable state has been found to be about 25° F. on either side of the glass transition temperature range of the particular resin, wherein the material has some particulate or shape retaining form, and is preferably about 10° F. on either side of this glass transition temperature range. If the temperature of the foam in the processing zone is allowed to exceed the glass transition temperature range of the foam by more than 25° F., the foam will form a completely fused mass, will bridge within the plug the narrow processing zone and when extricated may require additional grinding before reuse. Also, any trace amount of foaming agent which is not completely released during densification could cause the thermoplastic to reexpand, if this glass transition temperature range is exceeded by more than 25° F. If the temperature of the foam in the processing zone does not reach at least about 25° F. below the lower limit of the glass transition temperature range of the thermoplastic, the stresses within the polymer forming the cells may not be adequately relieved, so that all of the cells are not crushed during passage through the processing zone, or the crushed condition may be only temporary, with the result that the cells may return to their initial form on leaving the processing zone. Glass transition temperature range is herein defined as the temperature range in which there occurs a change in an amorphous polymer, or in an amorphous region of a partially crystalline polymer from a hard relatively brittle condition to a viscous rubbery condition. The polymer being processed usually comprises a blend of a number of differing molecular weight forms of a particular resin, each of which may have a glass transition temperature different from that of other forms. Typically, it was found that during a run with homopolymer polystyrene foam that the glass transition temperature of the blend being processed was within a 10 to 20° F. range.

At least one and preferably each of the inner surfaces of the plates are roughened to increase the mulling and frictional effect upon the material being worked into strands 58. In order to better facilitate formation of strands 58, the inner surface of plate 14 may be provided with a plurality of grooves 62 approaching the shape of an involute. Such grooves 62 are shown in FIG. 4 of the drawings, and serve to assist not only in the formation of strands 58 in that the material may roll within the grooves, but may also aid in moving the strands effectively toward the periphery of plate 14, and even increase the sojourn time of the material in the processing chamber, if this is desirable, because of their curved nature. Other grooved configurations having a similar effect may also be utilized.

In FIG. 5 of the drawings, there is shown a modification of the apparatus of the present invention. Therein, with the exception of the conical shape of the upper stationary plate 112 and the lower rotating plate 114, like parts have been designated with the referenced numerals used in FIG. 1. The operation of the modified form of the device shown in FIG. 5 is the same as that for FIG. 1. This embodiment may be used when long dwell times of the material in the processing chamber is desired because of the increased length of the path of polymer travel. Other plate shapes may also be utilized.

FIGS. 6 and 7 show horizontally and vertically oriented densifying apparatus embodiments utilizing off center feed systems, i.e. having a feed point which is radially offset with respect to the axial center line of the plates. Use of an off center feed to the processing chamber for the horizontally oriented parallel plate densifier of FIG. 7 may simplify and improve introduction of material between the plates, since the surface portion 84 of rotary member 86 is moving across the opening in feed port 88 of the stationary member 90. In so doing the feed material is continuously swept away from the feed port and into the processing chamber, 92. Plate 90 may be cut away as at 94 on the downstream side of the feed port to permit feed entry of the scrap particles between the plates. Though a forced feed system may be used with off center feeding, it may be possible to utilize gravity feed as shown in FIG. 6, because of the cleaning action of the off center feed port by the rotating plate.

FIG. 7 also illustrates a clearing paddle 96 attached to rotary plate 86 by means of arm 98 which may be used to maintain a constant level in trough 100 and move any buildup along in front of it to a central collection point not shown.

The vertical adaption of the densifier of FIG. 6 with offset feeding, may provide easier access for maintenance and adjustability of parts. The effect of gravity should not affect operation because of the gripping action on the foam by the plate members. Discharge will also be anywhere around the periphery of the plates. Also, as shown in FIG. 6, the stationary member 102 may be only a partial plate to the extent that is processing surface area is equivalent to only a portion, e.g. about ½ of that of the rotary plate, with an off center feed chute 104 feeding material between the plates slightly above the horizontal center line of the assembly. Plate 102 may have chamfered edges 106 and 108 to aid in introducing and discharging the material.

It should be understood that the features shown in the various embodiments described above are interchangeable. Obviously orientation of the process chamber along a plane intermediate the horizontal and vertical orientations previously described is also feasible.

Though a fixed member and a rotary member have been shown throughout the various embodiments, it is obvious that each member could be adapted to rotate at a different speed and in the opposite direction from the other, though this requires use of more complicated drive equipment over that required for the embodiments utilizing one fixed member.

In place of a rotary plate, a roller mounted continuous belt positioned adjacent the stationary member may also be used.

The following examples set forth in Table I were carried out with the apparatus shown in FIG. 1 of the drawings, and will serve to explain the operation of the device. Foamed polystyrene sheet was purchased from Sekisui Inc., and from W. R. Grace Co. under its trade name Cryovac Foam. To simulate scrap, the foam sheet in each instance was cut into fine flakes by means of a laboratory fly knife cutter and then screened using a 5/32" hole size screen. The density of the general purpose non-foamed resinous polystyrene from which the foamed sheet was formed from both Sekisui and W. R. Grace samples is in the range of between about 1.05 to 1.08 gms. per cc., whereas the density of the finely divided foam scrap generated from the foamed sheet was respectively 0.101 and 0.105 gram per cc. for the Sekisui and W. R. Grace samples.

The rotary speed and surface temperature of the movable plate is set forth for each example in Table I. The temperature of the stationary plate at the beginning of each run was at an ambient temperature of about 70° F. and rose slightly during operation. The temperatures of the rotary plate were obtained by means of a direct contract pyrometer. Plate spacing was maintained constant for each run. The pressure within the processing chamber between the plates was atmospheric in all cases.

TABLE I

| Run No. | Feed stock density (gms./cc.) | Rotary speed (r.p.m.) | Plate temp. (° F.) | Plate clearance (in.) | Resultant curd | | |
|---|---|---|---|---|---|---|---|
| | | | | | Diameter (in.) | Length (in.) | Density (gms./cc.) |
| 1 | 0.093 | 150 | About 200 | 1/8 | 1/8 | 1/2–1 | 0.935 |
| 2 | 0.093 | 150 | 225 | 1/16 | 3/32–1/8 | 1/2–2 | 0.971 |
| 3 | 0.093 | 150 | 170 | 3/16 | 1/4 | 1/2–3/4 | 0.956 |
| 4 | 0.093 | 150 | 220 | 1/16 | 1/16–1/8 | 1/2–3/4 | 0.994 |
| 5 | 0.125 | 150 | 225 | 1/8 | 1/8–1/4 | 1/2–1 1/2 | 0.780 |
| 6 | 0.125 | 150 | 225 | 1/32 | 1/32–1/16 | 1/4–3/4 | 1.012 |

The resultant densities of the curd material in each case showed that the apparatus of the present invention increased the density to a level which very closely approached that of the non-foamed virgin material. It should be noted that the temperatures utilized herein are particularly appropriate for polystyrene foam scrap and that accordingly temperatures of varying scope would be utilized for different reinous materials. As previously noted, it is particularly important that frictional heat, as well as any heat supplied by outside sources should be regulated so as to render the foam scrap material being processed short of the completely fused liquid state, since it is necessary that the material remain in a highly viscous state so that it can be worked and mulled by the relative rotation of the plates. In some cases it may only be necessary to heat the plates at start up with the frictional heat generated during operation being thereafter adequate or even excessive so that cooling may be required. In general, the temperature of the plate surfaces during operation should be maintained between about 100–350° F. and preferably between about 160–240° F. for styrene based polymers. The operating pressure in the processing chamber should be substantially atmospheric i.e. with no substantial back pressure in excess of about 5 p.s.i., so as not to contribute to the shear effect which promotes depolymerization and breakdown of the polymer being processed.

Though the foam scrap may be directly fed to the densifying apparatus in the same condition in which it is generated, it is preferable that the material be cut and reduced in size upstream of the densifier in order to reduce its bulk and facilitate handling and entry to the feed port.

Rotor speeds of between about 10 to 400 r.p.m., and plate clearances of between about 1/32 to 5/16" and preferably between about 1/16 to 3/16" have been found to be particularly suitable in the present invention.

As an important feature of the present invention, additional ingredients may be blended into the scrap as it is being passed through the densifying apparatus to eliminate a separate blending step and the apparatus required to carry it out which would otherwise be necessary in the process between the densifier discharge and the feed to the downstream foam forming equipment. Also, material such as solid blowing agents which decompose at elevated extrusion temperatures (for example 250–400° F.) could be effectively added to the scrap in the densifying operation, which is carried out for a shorter period and at a lower temperature (for example 165–240° F.) wherein such decomposition is insignificant. Liquid blowing agents might be added to the cut feed scrap just prior to its entry into the densifier. Virgin non-foamed polymer could also be added so that the discharge from the densifier could comprise the entire direct feed to the downstream foam forming extruder, or the densified scrap may itself be fed from the densifier to the foam forming extruder.

The thermoplastic resin compositions employed in this invention consist of a thermoplastic resin and a suitable foaming or pore-forming agent. Examples of thermoplastic resins that may be employed include cellulose ethers and esters, e.g., ethyl cellulose, cellulose acetate; homopolymers and interpolymers of monomeric compounds containing the $CH_2=C<$ grouping such as olefins, e.g., ethylene, propylene, isobutylene; vinyl halides, e.g., vinyl chloride; vinylidene chloride; vinyl esters of carboxylic acids, e.g., vinyl acetate, vinyl propionate, vinyl butyrate, vinyl benzoate; vinyl ethers, e.g., vinyl methyl ether, vinyl ethyl ether, vinyl isobutyl ether; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above mentioned vinylidene monomers with unsaturated alpha, beta-polycarboxylic acids and derivatives thereof, e.g., maleic anhydride, diethyl maleate, dibutyl fumarate, diallylmaleate, dipropyl maleate, etc. In general, optimum results are obtained with rigid, relatively nonelastic thermoplastic resins such as homopolymers and interpolymers of vinyl chloride, homopolymers of vinylidene aromatic compounds, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinyl aromatic compounds containing at least 70% of the vinyl aromatic compound. It is feasible and sometimes desirable to employ a blend of two or more thermoplastic resins such as a blend of styrene and a rubbery polymer such as natural rubber, butadiene-acrylonitrile rubbers, and the like. High impact polystyrene prepared by polymerizing monomeric styrene in the presence of a rubbery diene polymer may also be employed advantageously.

The densified foam product resulting from the process of the present invention has a very low heat history which is no more than about 2 minutes exposure during reprocessing to temperatures greater than 70° F. This is lower than that obtained by processing through a conventional die mounted on the discharge of an extruder. Otherwise the products in each case may be similar in appearance. Low heat history is important particularly with heat sensitive materials such as, for example, polymers of vinyl chloride, since the scrap particles will significantly change the color of the extruded sheet if they have been exposed to elevated temperatures for excessive periods. This discoloration results in production of off grade material or requires other processing means to compensate for it. The density of the reprocessed individual product strands generally approaches to within about 60 to 100% of the density of the non-foamed virgin material because of the substantial collapse of the foam cells during working in the relatively low temperature processing zone operating at essentially atmospheric pressure.

The present invention finds wide utility in the foam scrap reclaim field, and may be utilized to transform thermoplastic foam scrap into a useful form to facilitate further processing. The processing conditions are mild, and the product has a low heat history and a high density approaching that of the virgin material from which it was initially formed. Since operating pressures are essentially atmospheric with the open processing chamber utilized, the parts may be fabricated from relatively thin materials which in turn also facilitates temperature control from the standpoint of heat transfer rate and simplicity in construction of the heating and/or cooling means.

In describing the invention reference was made to preferred embodiments. Those familiar with the art will recognize that additions, deletions, substitutions or other modifications may be made within the purview of the invention as defined in the appended claims.

What is claimed is:

1. In a process for conditioning cellular thermoplastic foam scrap by mechanically working the scrap to crush the cells and increase the density thereof, the improvement which comprises:
   (a) establishing a substantially open, planar oriented processing zone limited by a pair of closely spaced opposing planar surfaces;
   (b) rotating one of the surfaces at between about 10 to 400 r.p.m. with respect to the other surface;
   (c) feeding the said cellular foam scrap having residual foaming agent entrapped within the cells into the processing zone between the closely spaced relatively rotating planar surfaces;
   (d) rolling the scrap outwardly between and against the planar surfaces toward the periphery thereof for no more than 2 minutes without changing the spacing of the surfaces from each other to collapse the walls of the foam cells by means of the friction developed between the foam scrap and the planar surfaces and substantially completely release the residual foaming agent; and
   (e) regulating scrap temperature within the processing zone by controlling the temperature of the opposing planar surfaces to within about 25° F. of the glass transition temperature range of the thermoplastic; whereby the bulk density of the foam scrap is gradually increased as the scrap moves toward the periphery of the surfaces without substantially increasing its heat history.

2. The process of claim 1 including the step of cutting the densified scrap as it issues from the periphery of the surfaces.

3. The process of claim 1 wherein the scrap is fed into the processing zone to one side of the axis of the rotating surface.

References Cited

UNITED STATES PATENTS

| | | | |
|---|---|---|---|
| 2,838,801 | 6/1958 | De Long | 264—53 X |
| 3,089,857 | 5/1963 | Pottenger | 264—53 X |
| 3,277,520 | 10/1966 | Nakahara. | |
| 3,278,661 | 10/1966 | Beck | 264—68 |
| 3,287,480 | 11/1966 | Wechsler | 264—118 X |
| 3,344,212 | 9/1967 | Francis | 264—321 X |
| 3,389,203 | 6/1968 | Merges | 264—140 |
| 3,396,062 | 8/1968 | White | 264—321 X |

DONALD J. ARNOLD, Primary Examiner

P. A. LEIPOLD, Assistant Examiner

U.S. Cl. X.R.

18—1, 12; 264—37, 68, 117, 321